United States Patent [19]

Heinrich et al.

[11] 3,723,641

[45] Mar. 27, 1973

[54] FACSIMILE TRANSMISSION METHOD AND APPARATUS

[75] Inventors: Frank-Armin Heinrich, Korb; Dieter Prause, Esslingen/Neckar; Rolf Sost, Stuttgart, all of Germany

[73] Assignee: Robert Bosch Elektronik GmbH, Berlin, Germany

[22] Filed: Mar. 31, 1971

[21] Appl. No.: 129,815

[30] Foreign Application Priority Data

Apr. 2, 1970 Germany....................P 20 15 695.0

[52] U.S. Cl...................................178/6, 178/DIG. 3

[51] Int. Cl.............................H04n 1/40, H04n 7/12

[58] Field of Search..........................178/DIG. 3, 6.8

[56] References Cited

UNITED STATES PATENTS

| | | | |
|---|---|---|---|
| 2,909,601 | 10/1959 | Fleckenstein et al. | 178/DIG. 3 |
| 3,560,639 | 2/1971 | Centanni | 178/DIG. 3 |
| 3,483,317 | 12/1969 | De Groat | 178/DIG. 3 |
| 2,978,535 | 4/1961 | Brown | 178/6 |

*Primary Examiner*—Howard W. Britton
*Attorney*—Spencer & Kaye

[57] ABSTRACT

An improved facsimile transmission method and apparatus whereby the data to be transmitted may be transmitted in a shorter time than with conventional facsimile systems. The picture to be transmitted is scanned line-by-line with a conventional photoelectric scanner, but preferably at a speed such that the scanning frequency is greater than the maximum transmission frequency of the transmission channel, and the scanning voltage, which represents at least two different brightness values, preferably black and white, for a single line stored in a memory. The memory is then read out and the number of consecutive identical brightness value signals counted. Each time that the brightness value signal changes its value, e.g., from white to black or vice versa, the readout of the memory is interrupted, or temporarily delayed, until a pulse sequence representing the counted identical consecutive brightness signals and the brightness value has been formed and transmitted. This sequence of steps is repeated for each picture line to be transmitted.

10 Claims, 4 Drawing Figures

Inventors.
Frank-Armin Heinrich
Dieter Prause
Rolf Sost
BY Spencer & Kaye
ATTORNEYS.

Inventors.
Frank-Armin Heinrich
Dieter Prause
Rolf Sost

BY Spencer & Kaye
ATTORNEYS

Inventors.
Frank-Armin
Dieter Prause
Rolf Sost
BY Spencer & Kaye
ATTORNEYS

FACSIMILE TRANSMISSION METHOD AND APPARATUS

BACKGROUND OF THE INVENTION

The present invention relates to a facsimile system. More particularly, the present invention relates to a method and apparatus for transmitting a picture by line-by-line photoelectric scanning of the picture elements to provide a scanning voltage which is divided into at least two brightness values, preferably a black value and a white value, which is then stored, read out and the black values and white values converted into a pulse sequence serving to transmit these values.

In the known facsimile devices, to transmit the black and white picture content of the picture to be transmitted, e.g., a document or a photograph, the picture to be transmitted is scanned, preferably photoelectrically, at the transmitting end at a uniform speed and in a line-by-line manner, so that a picture signal or scanning voltage is produced which is proportional to the respective brightness values of the picture elements. When the picture signal voltage which has been transmitted, for example, by a modulation of a carrier frequency is received, the picture signals obtained by demodulation control a recording device which produces a reproduction of the transmitted picture in synchronism with the scanning movement at the transmitting end. In such systems, the scanning speed, or the number of picture elements scanned per unit time is limited by the maximum permissible transmission frequency of the transmission channel between the picture transmitter and the picture receiver.

If a picture transmission is to take place over the public telephone network, the expense of transmitting a picture depends on the length of time the telephone connection path is occupied. To keep these expenses as low as possible, it is therefore desirable to shorten the time required for the transmission of the picture. It has been found, however, that an effective decrease in the required transmission time can only be obtained if the information content of a picture is compacted in some way.

SUMMARY OF THE INVENTION

It is, therefore, the object of the present invention to develop a picture transmission process which makes possible an almost optimum decrease in the transmission time of the picture with permissible expenditures.

This is accomplished according to the present invention by an improved method for transmitting a picture by means of line-by-line scanning of the picture elements to provide a scanning voltage which is divided into at least two brightness values, preferably a black value and a white value, and which is temporarily stored, and subsequently read out and the black values and the white values converted into a sequence of binary words derived by a run length coding process which serves to transmit these values. According to the invention the picture elements are scanned with an increased constant speed, and the scanning voltage containing the black brightness values and the white brightness values for an individual picture line is stored in a memory. During subsequent read-out identical, consecutive brightness values are counted and read-out of the memory is interrupted at each change in the brightness values until a signal characterizing the counted number and the associated brightness value has been formed and transmitted to the receiver. The stored brightness values are erased no later than after completion of the reading out of all brightness values in the memory corresponding to a single line. After the conversion of all of the brightness value signals stored in the memory to a signal which has been transmitted to the receiver, the next succeeding line of the picture is scanned and the sequence of operations repeated.

According to a further feature of the invention the scanning frequency and the read-out frequency for the memory are greater than the maximum transmission frequency for the transmission channel between the facsimile transmitter receiver.

According to a further feature of the invention, the time lost due to scanning and storage between adjacent lines is minimized by utilizing two memories which are operated in such a manner that the scanning voltage from one picture line is being stored in one memory while the scanning voltage representing the immediately preceding line is being read out of the other memory.

DESCRIPTION OF THE PREFERRED EMBODIMENT

Figure 1:
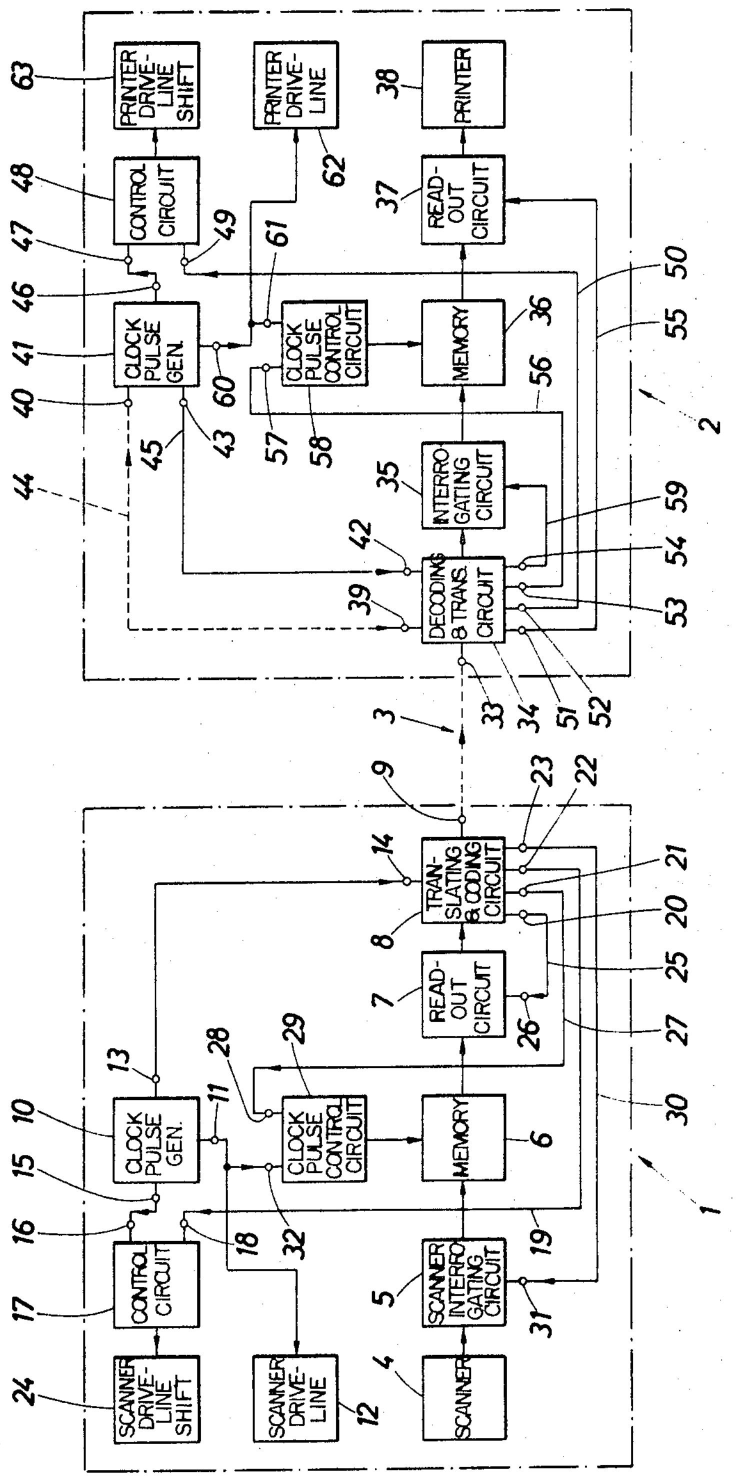
FIG. 1 is a block circuit diagram of a picture transmitter and receiver for a facsimile device according to the present invention.

In the block circuit diagram according to FIG. 1 the two parts thereof which are outlined by dot-dash lines indicate a picture transmitter 1 and a picture receiver 2 for a facsimile system for transmitting the black and white picture content of a picture to be transmitted. Between the picture transmitter 1 and the picture receiver 2 there is provided a transmission channel 3, e.g., a telephone line or a radio channel.

The picture transmitter 1 comprises a scanner 4 of conventional design, i.e., a device operating, for example, according to the photoelectric principle, which scans a picture to be transmitted in a line-by-line manner to provide a scanning voltage signal representative of the various degrees of brightness of the picture. The output of the scanner 4 is connected to the input of the series connection of an interrogating circuit 5, a memory 6, which is preferably electronic, a read-out circuit 7 and a data signal input of a converting, or translating, and coding circuit 8. The data signal output 9 of the circuit 8 forms the output of transmitter 1 and is connected with one end of transmission channel 3. Synchronization and basic switching control of transmitter 1 is provided by a central clock pulse generator 10 which has one output 11 connected directly to a drive means 12 for the movement of scanner 4 in the direction of the lines; a second output 13 connected to a control input 14 of the converting and coding circuit 8; and a third output 15 connected to one input 16 of a logic control circuit or gate 17 whose other input 18 is connected via a line 19 to an output 22, which is one of four control outputs 20 to 23, of the converting and coding circuit 8. The output of control circuit 17 is connected with a drive means 24 for the movement of scanner 4 transverse to the line direction, i.e., to change from one line to the next, for driving same. A line 25 leads from the control signal output 20 of the converting and coding circuit 8 to an input 26 of the readout circuit 7; a line 27 leads from the control signal output 21 to an input 28 of a clock pulse control circuit or gate 29; and a line 30 leads from the control signal output 23 to the input 31 of the interrogation circuit 5. As will be explained below, the output signals appearing at outputs 20–23 control the reading in and the reading out of the data from the memory 6. The other input 32 of the clock pulse control circuit 29 is directly connected with the output 11 of the clock pulse generator 10, and the output of the clock pulse control circuit 29 is connected with a control input of memory 6.

The picture receiver 2 of the facsimile device comprises an input 33, to which is connected a series-connection of a translation and decoding circuit 34, a write-in circuit 35, an electronic memory 36, a readout circuit 37 and a writing means 38. Between one terminal 39 of the translation and decoding circuit 34, and a terminal 40 of a clock pulse generator 41 and between one input 42 of the translation and coding circuit and one output 43 of clock pulse generator 41 are connected lines 44 or 45, respectively. Line 44 serves to synchronize the clock pulse generator 41 with generator 10 while line 45 serves to control the switching of circuit 34. The clock pulse generator 41, in addition to the output 45, has an output 46 connected to an input 47 of a logic control circuit or gate 48, whose other input 49 is connected via line 50 to an output 52, which is one of four control signal outputs 51 to 54, of the translation and decoding circuit 34. The control signal output 51 of the translating and decoding circuit 34 is connected via a line 55 with the read-out circuit 37; the control signal output 53 is connected, via a line 56, with an input 57 of a clock pulse control circuit or gate 58 and the control signal output 54 via a line 59, with the write-in circuit 35. A further output 60 of the clock pulse generator 41 is connected to a further input 61 of the clock pulse control circuit 58 and to a drive means 62 for the movement from line to line of the writing means 38, while the output of the logic control circuit 48 is connected to a drive means 63 for the line change of the writing means 38.

The writing means 38 may comprise, for example, a thin electrode as the writing element, which is controlled, for example, only by the black values of the received signal in such a manner that it burns out the metal layer of a metal sheet which serves as the recording carrier. The reproduction or facsimile of the picture at the transmitting end is then produced at the receiving end by the contrast between the burnt-out black areas and the shiny metal layer. In order to better explain the operation of the transmitter according to FIG. 1, the elements comprising the scanner 4 according to FIG. 1 are shown schematically in more detail in FIG. 2.

Figure 2:
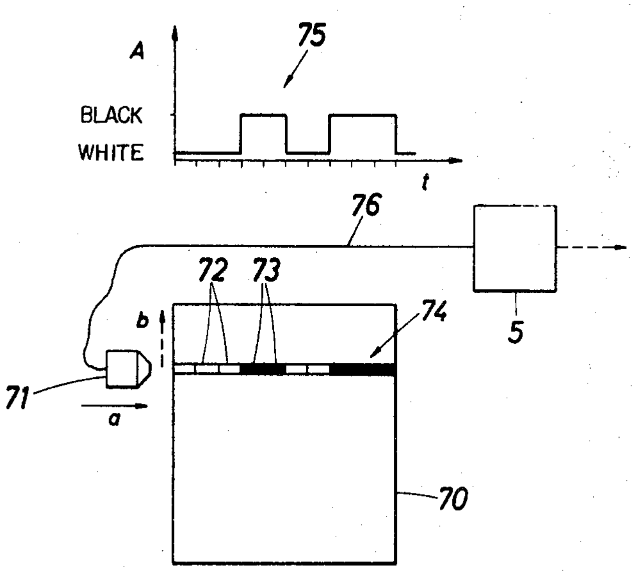
FIG. 2 is a schematic representation of the scanning process as well as a diagram showing the scanning voltage of a picture line in dependence on time.

As shown in FIG. 2 a picture 70 to be transmitted which is, for example, a planar black-and-white picture, is clamped tight into a clamping device which is not shown in the drawing. The scanning element 71 of the scanner 4, which is preferably photoelectric, for example, is moved parallel to the plane of the picture in such a manner that it is moved over the picture at a constant speed either in the direction of the lines (arrow *a*) or in steps transverse to the direction of the lines (arrow *b*). During scanning of a picture line which, for reasons of simplicity, exhibits only black and white picture elements in the direction of the lines, the scanning element 71 furnishes a pulse-shaped voltage which corresponds to the white and black picture elements 72, 73 of a picture line 74. This pulse-shaped scanning voltage is shown by diagram 75 in FIG. 2. As illustrated, a white picture element 72 results in a voltage of, for example, somewhat more than zero volts, whereas a black picture element 73 corresponds to, for example, a positive voltage of several volts. If it is assumed, for example, that one picture line is composed of 10 imaginary picture elements of equal time deviation (corresponding to the picture dots of a television image) — in reality this number is substantially higher — then the picture line 74 contains, from left to right, three white, two black, two white and three black picture elements (3 W, 2 B, 2 W, 3 B). The constant speed of the scanning element 71 along a line (arrow *a*) is selected in the present case to be high enough so that the picture elements 72, 73 scanned per unit time and with a continual alternation of black and white would correspond to a frequency which is substantially higher than the corresponding frequency of the known facsimile devices, i.e., higher than the maximum permissible frequency of transmission channel 3. The scanning process thus takes place at a relatively high speed.

However, in order to keep the bandwidth within the conventional limits during the picture transmission in spite of the increased scanning speed, the following individual measures which will be described in detail below, are taken: The scanning voltage furnished by scanning element 71 (FIG. 2) from scanning a picture line 74 containing, for example, only black and white picture elements 72, 73 (see diagram 75) passes through a line 76 to the input of the interrogation circuit 5 which is controlled via the line 30 from the translation and coding circuit 8, which itself is under the control of clock pulse generator 10, so that the storing process begins as soon as scanner 71 has reached the beginning of a picture line 74. The clock pulse generator 10 furnishes at least one pulse-shaped voltage at a constant frequency from which different frequencies can be derived, for example by frequency division, which serve to control the timing of the movements of scanner 4, of the translation and coding circuit 8, whose operation will be described below, as well as the storing process so that all operations in the transmitter 1 are synchronized. The clock pulse control circuit 29 is controlled via the line 27 from the translating and coding circuit 8 at the onset of the scanning of one picture line so that it allows the pulse-shaped output voltage from the clock pulse generator to reach memory 6.

Once the writing-in or storage in memory 6 of the scanning voltage of one picture line is completed, the translation and coding circuit 8 via line 30 causes the interrogation circuit 5 to sever the connection between the scanner 4 and the memory 6. At the same time, the read-out circuit 7 is directly controlled by the translation and coding circuit 8 via the line 25 so that a connection between the output of memory 6 and the translation and coding circuit 8 is provided.

At the time that read-in via circuit 5 is severed and read-out via circuit 7 initiated, the clock pulse control circuit 29 initially remains uninfluenced, i.e., it continues to furnish the pulse-shaped voltage of a certain frequency required for the read-out, which will be called the read-out frequency hereafter and which originates from the clock pulse generator 10. In the present case, read-out is understood to mean that the read-out of a stored brightness value signal (i.e., the brightness value of a picture element) is always coupled with an erasure of this picture element signal in the memory 6. The read-out brightness value signals are passed through the read-out circuit 7 to the translating and coding circuit 8. The translator portion of the translating and coding circuit 8 serves the purpose of counting consecutive, identical brightness values signals, until a change in the brightness value signals occurs. In the present example, see FIG. 2, this occurs for the first time after three white picture elements 72. The then following change in the brightness value signal from white to black is detected by the translator and is evaluated in such a manner that it temporarily switches the clock pulse control circuit 29, so that further pulses from clock pulse generator 10 do not reach memory 6 and further reading out is initially interrupted. At the same time the coding circuit of the translating and coding circuit 8 converts the number "3" counted by the translator to a coded number, e.g., a pulse block which also contains the associated brightness state, in this case "white." This type of coding, which is generally known as run length coding, is here so selected that the pulse blocks can be transmitted through transmission channel 3 as interference-free as possible.

The pulse block produced in this manner is then immediately transmitted as will be described in detail below. Directly thereafter the clock pulse control circuit 29 is controlled by the translating and coding circuit 8 via the line 27 to resume the furnishing of read-out pulses from clock pulse generator 10 to memory 6. The reading out will then continue until there is a change in the amplitude of the stored brightness value signals, in the present example after two black picture elements 73 (see picture line 74 in FIG. 2). From the number "2" and the associated brightness value "-black" the coding circuit derives a further coded pulse block. Read-out, translation, coding and transmission are then continued until finally all brightness value signals of the picture line are completely read out and transmitted. Short pauses exist between the individual emitted pulse blocks which are caused by the time required for counting the number of identical brightness value signals. If the transmission of the pulse blocks is begun, with the appropriate coding, during the counting period, these pauses may become as short as desired. The following relationship exists between the pulse repetition frequency, i.e., the transmission speed at which the information reaches channel 3, and the read-out frequency, which is simultaneously the counting frequency: The read-out frequency or the counting frequency, respectively, are so selected that the pulse blocks which are emitted after coding reach the transmission channel 3 with a pulse repetition frequency which approximates the channel capacity, i.e., the maximum transmittable frequency for the transmission channel, as closely as possible.

Since in the pictures to be transmitted in practice the change in the brightness value signals is relatively small, i.e., the number of pulse blocks per picture line is much less than that which would occur when the brightness value signals continuously change from picture element to picture element, the speed of reading out between two respective changes in brightness value signals or the counting speed, respectively, may be increased by a corresponding amount. On the average this permits the time for generating and transmitting the pulses to be reduced by, for example, more than one-fifth as compared to the time required in the conventional facsimile processes.

Once the brightness value signals of a picture line which were stored in memory 6 have been read out and the corresponding pulse blocks transmitted, the translator of the translating and coding circuit 8 emits a control signal via line 19 to the control circuit 17 which switches on the drive means 24 for the line shift so that scanning element 71 (FIG. 2) of scanner 4 performs a step-like movement transverse to the direction of the lines, i.e., in the direction of arrow *b*, or the picture to be transmitted 70 is moved a step transverse to the line direction, i.e., opposite to the direction of arrow *b*. Scanning of the subsequent picture lines of the picture 70 to be transmitted and the transmission of the pulse blocks then occurs automatically until the end of the last picture line of the picture to be transmitted has been reached and the last pulse block has been transmitted. The translating and coding circuit 8 controls the clock pulse control circuit 29 in such a manner that no more read-out pulses are fed to memory 6. At the same time the translating and coding circuit 8 cuts the connection between scanner 4 and memory 6 as well as between itself and memory 6 by means of interrogation circuit 5 or read-out circuit 7, respectively. Additionally, scanner 4 is automatically returned to the starting position which it takes up at the onset of the picture scanning process.

A detailed description of the operation of the picture receiver 2 is not believed to be necessary since it substantially represents a reversal of the sequence of the steps performed in the transmitter 1. It should be noted, however, that the received signal is applied to the input 33 of the picture receiver 2 and is first decoded in the translating and decoding circuit 34. The clock pulse generator 41 is synchronized via line 44 with the pulses obtained by the decoding of the received signal, which are then fed to the translator of the translating and decoding circuit 34 so that the number of identical consecutive brightness value signals corresponding to this number are obtained. This information is then fed by picture line via the write-in circuit 35, which is controlled by the translation and decoding circuit 34, into memory 36 and via the readout circuit 37, which is also controlled by the translating and decoding circuit 34, to a writing means 38 with which the transmitted picture information is recorded line by line.

Figure 3:
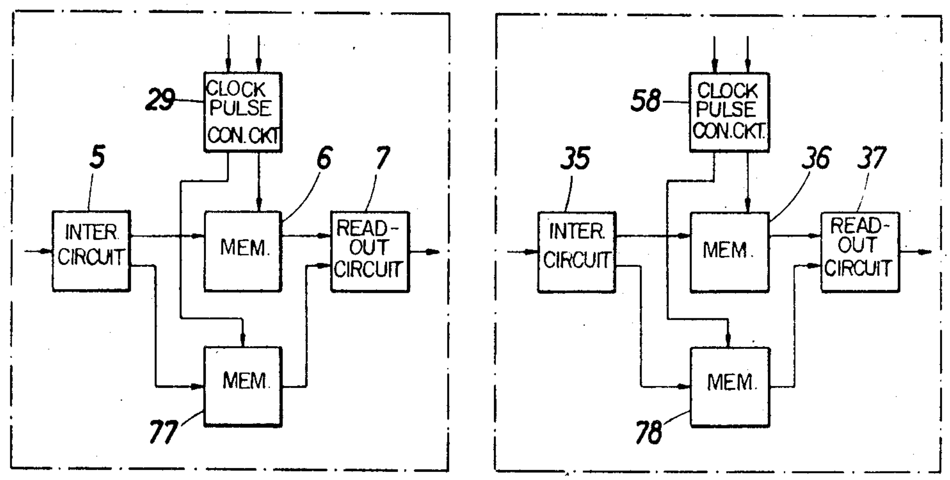
FIG. 3 shows a portion of the block circuit diagram of FIG. 1 illustrating a modification thereof wherein an additional memory has been added in both the picture transmitter and receiver.

An improved method for transmitting the black and white picture contents of a picture to be transmitted will be explained with the aid of the portion of the block circuit diagram of FIG. 1 as shown in a modified version in FIG. 3 as well as with the diagrams of FIGS. 4A to 4C. The above-described method solves the problem of reducing the transmission time for one picture compared to the conventional methods. However, time losses occur between emission of the pulse blocks for each picture line. That is, the time required for scanning and storing the brightness value signals of one picture line of the picture to be transmitted constitutes lost time because during this time memory 6 does not furnish information and consequently the transmission channel is not utilized. In order to keep these time losses during the transmission as short as possible, or to substantially reduce them, according to an embodiment of the invention, two memories 6, 77, or 36, 37 respectively, are provided in both the picture transmitter 1 and the picture receiver 2. Moreover, the interrogation circuit 5 and the write-in circuit 35 are provided with two outputs, one of which is connected with the input of memory 6 or 36, respectively, and the other of which is connected with the input of memory 77 or 78, respectively. The clock pulse control circuits 29 and 58 each have two outputs to control memories 6 and 77 or 36 and 78, respectively, and the read-out circuits 7 and 37 each have two inputs which are connected with the outputs of memories 6, 77 or 36, 78, respectively.

When two memories 6, 77, are utilized in the transmitter 1 the interrogation circuit 5 and the read-out circuit 7 are controlled via the control output lines 30 and 25 respectively of translating and coding circuit 8 so that they are simultaneously and alternately connected to different ones of the memories. That is, while the scanning voltage signal is being read out of, for example, memory 6 by means of the read-out circuit 7, the interrogating circuit 5 is reading the scanning voltage signal from the immediately following picture line into memory 77. After the reading out of memory 6 has been completed, the circuit 8 causes the circuits 5 and 7 to change their output and input connections respectively so that memory 6 is now receiving signals and memory 77 is being read out. The control of the two memories 36 and 78 in the receiver 2 is similar.

Figure 4:
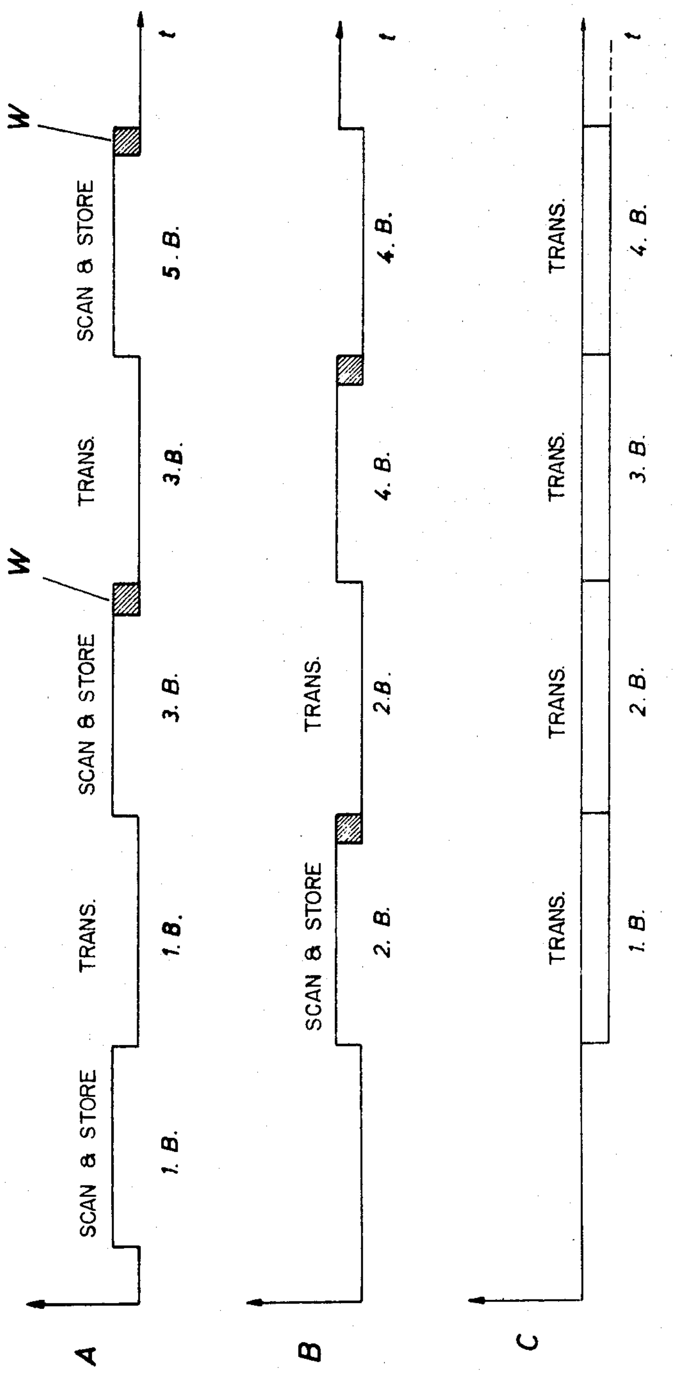
FIGS. 4A through 4C are diagrams showing the time sequence of read-out and storing as well as the transmission process for a picture transmitter having two memories.

The above described mode of operation for two memories and the advantages realized thereby are illustrated in the diagrams of FIGS. 4A to 4C. As can be seen in FIG. 4C, the emission of the contents of two consecutive picture lines is no longer separated by a lost time interval as in the mode of operation described with respect to FIGS. 1 and 2, but rather, in the ideal case, the contents of all picture lines are directly lined up one after the other. According to the diagram of FIG. 4A, which relates to the scanning (Scan.), storing (Store) and transmitting (Trans.) times in connection with the memory 6 of FIG. 3, a waiting period W appears, beginning with the scanning and storing of the contents of the second picture line 2.B. in FIG. 4B) into the memory 77, between the storing and transmitting actions. This waiting time W is caused by the fact that after scanning and storing the brightness value signals of the second picture line (Scan. and Store, 2.B., FIG. 4B), read-out and transmission must not take place immediately because the transmission of the pulse blocks originating from the first picture line (Trans., 1.B., FIGS. 4A and C) must first be completed. In FIGS. 4A to 4C the times required for transmitting the pulse blocks of the picture lines are assumed to be constant for reasons of simplicity, although these times in practice depend on the respective number of changes in the brightness value signals per picture line.

When two memories are used, the (constant) time required for scanning and storing all brightness value signals of one picture line (see, for example, Scan. and Store 2.B. in FIG. 4B) should always be somewhat shorter than the shortest time required for transmitting the pulse blocks of the preceding picture line, see in this connection FIG. 4C, 1.B. Otherwise the problem could occur that the contents of one picture line have already been transmitted while the contents of the next picture line have not been completely stored and are thus not ready for transmission.

It will be understood that the above description of the present invention is susceptible to various modifications, changes and adaptations, and the same are intended to be comprehended within the meaning and range of equivalents of the appended claims.

We claim:

1. In a method of transmitting a picture from a first location to a second location via a transmission channel wherein the picture to be transmitted is photoelectrically scanned by a scanner moved in a line-by-line manner to produce a scanning voltage signal which is divided into at least two brightness value signals representing a black value and white value of the scanned picture elements and the scanning voltage is converted into binary code words derived by run length coding and representative of the brightness value signals for transmission, via the transmission channel, the improvement comprising:

scanning a picture line at a relatively high constant speed to provide a scanning voltage representative of the brightness value signals of the picture elements of said picture line;

storing the scanning voltage corresponding to a single picture line in a memory;

following the storage of the scanning voltage, interrogating the memory to read out the stored scanning voltage at a higher speed than the scanning of the picture elements and counting the number of consecutive identical brightness value signals;

each time a change in the read-out scanning voltage, indicating a change in brightness value, is detected, interrupting the interrogation of the memory until a binary word representing the counted number of consecutive identical brightness value signals and the associated brightness value has been formed and transmitted; and repeating the above sequence of steps for each line of the picture.

2. The method defined in claim 1 including the step of erasing the stored brightness value signals no later than after completion of the interrogation of all of the brightness values corresponding to one picture line stored in the memory.

3. The method defined in claim 1 wherein the speed of scanning the picture elements and the speed of interrogating the brightness values stored in the memory are so selected that the frequency corresponding to the number of picture elements scanned per unit time and the frequency of counting consecutive identical brightness values is higher than the maximum transmittable frequency of the transmission channel.

4. The method defined in claim 1 wherein two memories are utilized, each of which stores the scanning voltage signal of one of a pair of consecutive picture lines, and including the steps of:

alternately interrogating the memories and transmitting said pulse sequence signals representative of the signals stored therein; and storing the scanning voltage signal from a picture line in one of said memories during the time required for the scanning voltage signal from the immediately preceding line to be read out of the other of the memories and transmitted as a pulse sequence, whereby the time lost between the transmission of signals corresponding to two consecutive picture lines is minimized.

5. The method defined in claim 4 wherein the time for storing a scanning voltage signal containing all of the brightness values from one picture line in a memory is shorter than the shortest time required for the transmission of the signals read out of a memory during interrogation thereof.

6. Facsimile apparatus for the transmission of a picture from a first location to a second distant location via a transmission channel, comprising, in combination:

a photoelectric scanning means moved in a line-by-line pattern for scanning the picture at a relatively high constant speed per line and providing an output scanning voltage signal having at least two different voltage values representative of at least a black brightness value and a white brightness value respectively;

a memory means for storing the scanning voltage representative of a single scanned line of the picture;

circuit means for reading out the brightness value signals stored in said memory means at a higher speed than the scanning of the picture elements; and translation circuit means for counting the number of consecutive identical brightness value signals read from said memory and for temporarily interrupting the reading-out of the brightness value signals whenever a change in the brightness value signal is detected until such time as it has formed and transmitted binary code words derived by run length coding and representative of the number of identical brightness value signals which were counted and the brightness value.

7. The facsimile apparatus defined in claim 6 including a clock pulse generator which furnishes a pulse-shaped voltage of constant frequency for controlling and synchronizing the time sequence of the storing and reading out of the brightness value signals from said memory, the counting of the interrogated brightness value signals by said translating circuit means, and the movement of said scanning means.

8. The facsimile apparatus defined in claim 6 wherein said memory means includes a pair of memories and wherein said apparatus includes means for alternately connecting the respective inputs and outputs of said memories to said scanning means and said read-out means respectively so that the scanning voltage signal from one picture line is being read into one of said memories while the scanning voltage signal from the immediately preceding picture line is being read out of the other of said memories.

9. The facsimile apparatus defined in claim 6 wherein an interrogation circuit is connected in series between said scanning means and said memory means, sad interrogation circuit being responsive to a signal from said translation circuit means for connecting and disconnecting said scanning means and said memory means; wherein said read-out circuit means is responsive to an output signal from said translation circuit means, said read-out circuit means erasing the respective brightness value signals upon completion of its being read out; and wherein a clock pulse generator means is provided for directly controlling a drive means for moving said scanning means in the direction of a line and said translating circuit means, and for controlling, via control gates, the drive for the line shifting of said scanning means and the shifting of signals into and out of said memory, said control gates being further controlled by output signals from said translation circuit means.

10. The facsimile apparatus defined in claim 6 wherein said translating circuit means includes a first input connected via said read-out circuit means with the output of said memory means, a second input connected with the output of a clock pulse generator, a first output in communication with said transmission channel for providing output data signals, and four further outputs for providing control output signals, of which the first control output is connected to one input of said read-out circuit means, the second control output of said translating circuit means is connected to a first input of a clock pulse control circuit which has its second input connected to the output of said clock pulse generator and its output controlling the shifting of data in said memory means, the third control output of said translating circuit means is connected to one input of a control circuit for controlling the shift of said scanning means which control circuit has its other input connected to the output of said clock pulse generator, and the fourth control output of said translating circuit means is connected to one input of an interrogation circuit which is connected between said scanning means and said memory means.

* * * * *